(12) United States Patent
Fuse

(10) Patent No.: US 6,486,986 B1
(45) Date of Patent: Nov. 26, 2002

(54) SYSTEM FOR OPTICALLY TRANSMITTING FREQUENCY-DIVISION-MULTIPLEXED SIGNAL AND TRANSMITTER THEREFOR

(75) Inventor: Masaru Fuse, Toyonaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/417,541

(22) Filed: Oct. 14, 1999

(30) Foreign Application Priority Data

Oct. 14, 1998 (JP) .......................................... 10-291691

(51) Int. Cl.⁷ .......................... H04J 14/02; H04B 10/04
(52) U.S. Cl. ...................................... 359/124; 359/182
(58) Field of Search ............................... 359/124, 154, 359/181–182; 370/295

(56) References Cited

U.S. PATENT DOCUMENTS

| | | | | |
|---|---|---|---|---|
| 4,722,081 A | * | 1/1988 | Fujito et al. | 359/124 |
| 4,768,186 A | * | 8/1988 | Bodell | 359/124 |
| 4,959,862 A | * | 9/1990 | Davidov et al. | 380/10 |
| 5,016,242 A | * | 5/1991 | Tang | 359/124 |
| 5,351,148 A | * | 9/1994 | Madea et al. | 359/124 |
| 5,373,383 A | * | 12/1994 | LaGasse | 359/161 |
| 2001/0008451 A1 | * | 7/2001 | Ishii et al. | 359/124 |

OTHER PUBLICATIONS

"Optical Super Wide–Band FM Modulation Scheme and Its Application to Multi–Channel AM Video Transmission Systems" by Kikushima et al., IOOC '95 Technical Digest, vol. 5, PD2-7, pp. 33–34.

* cited by examiner

Primary Examiner—Kinfe-Michael Negash
(74) Attorney, Agent, or Firm—Wenderoth, Lind & Ponack, L.L.P.

(57) ABSTRACT

In an optical transmission system, a multiplexer frequency-division-multiplexes a plurality of signals, and outputs the resultant signal to an FM modularor. The FM modulator converts the frequency-division-multiplexed signal into an FM modulated signal through frequency modulation using the frequency-division-multiplexed signal as an original signal. A frequency-divider converts the FM modulated signal into a frequency-divided FM modulated signal whose frequency is $\frac{1}{2^n}$ (n is an integer of not less than 1) the frequency of the FM modulated signal. An optical modulator has a predetermined input-voltage vs. output-optical-power characteristic, and is biased at the minimum point (voltage) about the output optical power. The optical modulator modulates an unmodulated light fed from a light source with the applied frequency-divided FM modulated signal to produce an optical signal whose optical carrier component is suppressed, and sends the optical signal to an optical transmission line. An optical receiver receives the optical signal, and square-law detects the signal to convert into an FM modulated signal. A FM demodulator demodulates the FM modulated signal to reproduce the original frequency-division-multiplexed signal. This configuration makes it possible to narrow the bandwidth of an FM modulated signal while increasing the frequency deviation thereof, and realize high-quality signal transmission as a result.

14 Claims, 12 Drawing Sheets

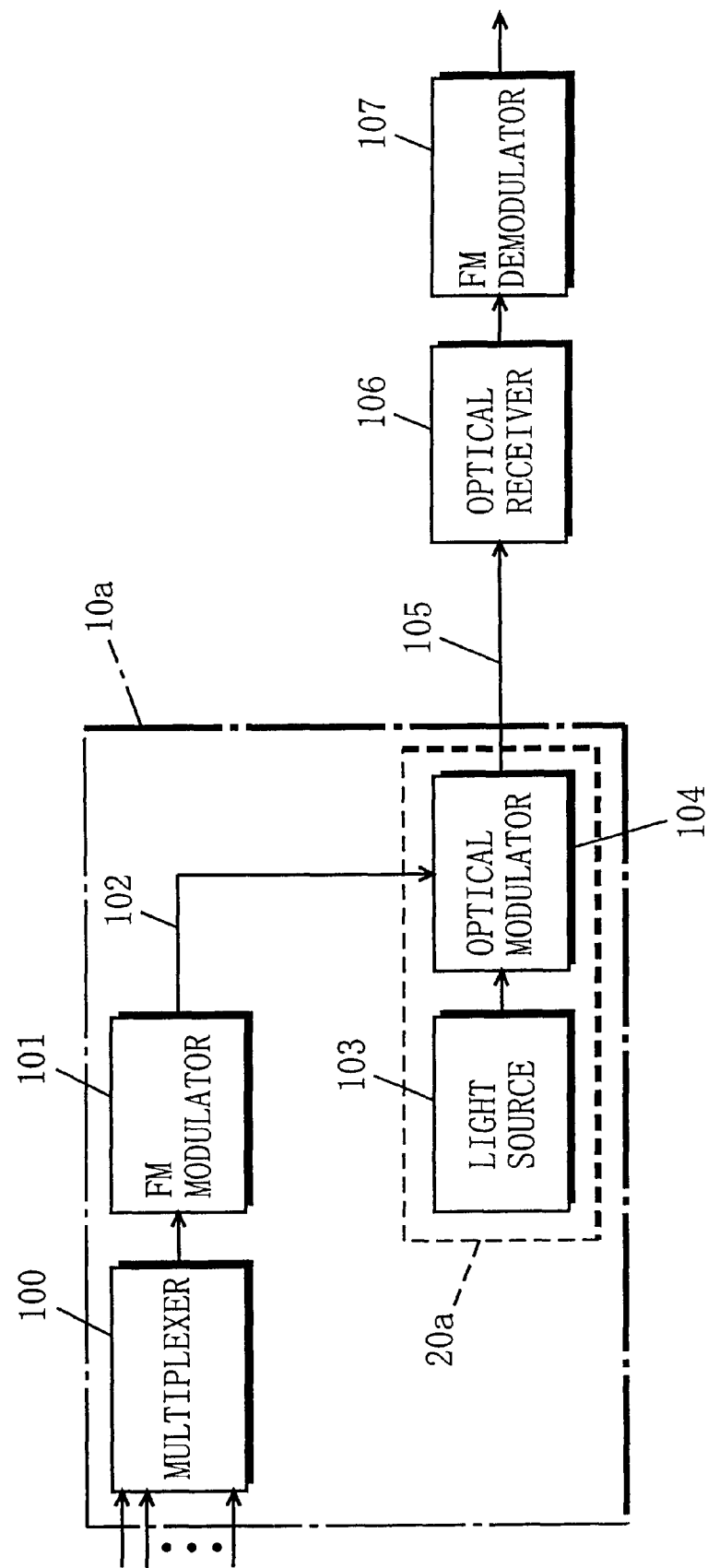

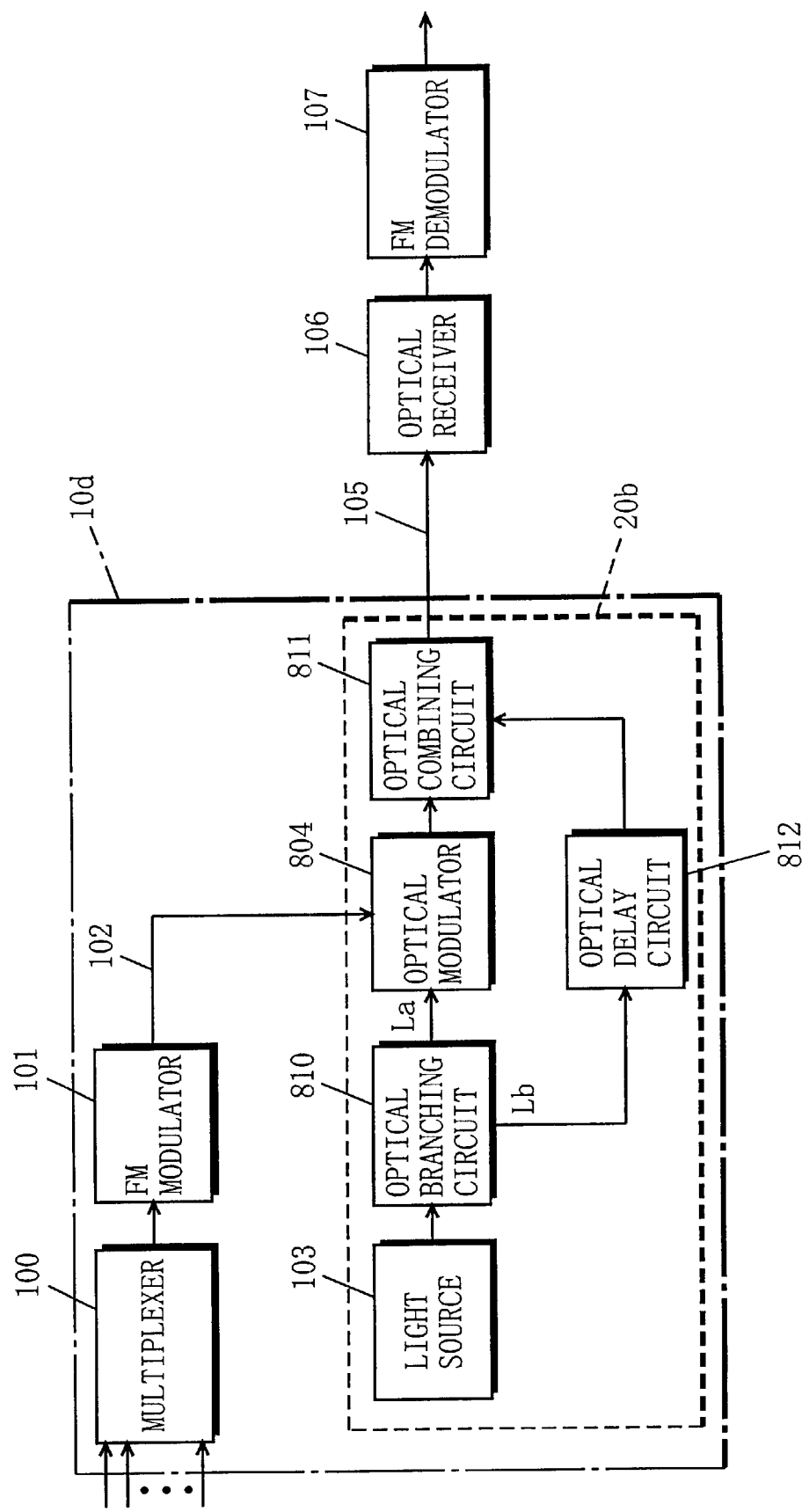

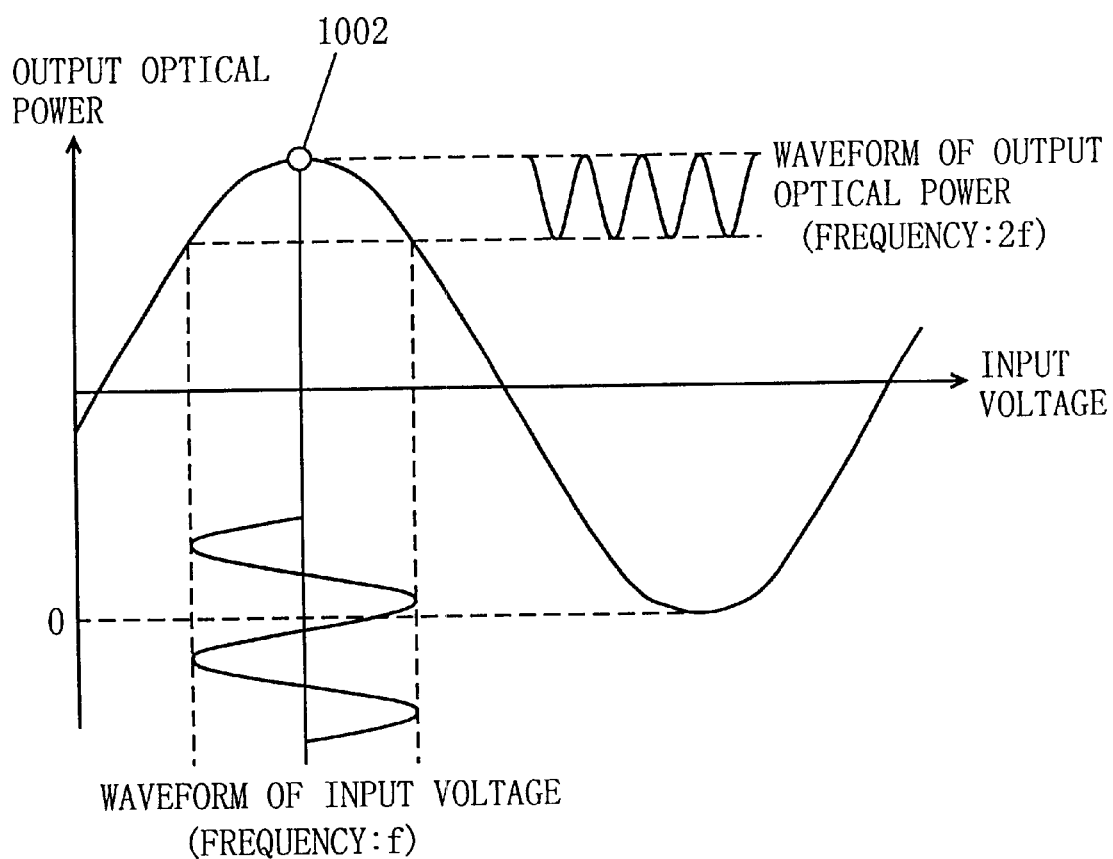

SYSTEM FOR OPTICALLY TRANSMITTING FREQUENCY-DIVISION-MULTIPLEXED SIGNAL AND TRANSMITTER THEREFOR

BACKGROUND OF THE INVENTION

1. Field of the Invention

The present invention relates to optical transmission systems, and more particularly to a system that optically transmits a frequency-division-multiplexed signal obtained by frequency-division-multiplexing a plurality of signals.

2. Description of the Background Art

FIG. 11 is a block diagram exemplarily showing the configuration of a conventional optical transmission system for transmitting a frequency-division-multiplexed signal. As will be known from FIG. 11, this optical transmission system comprises a multiplexer 1100, an FM modulator 1101, an optical transmitter 1104, an optical receiver 1106, and an FM demodulator 1107. In the optical transmission system, an electrical transmission line 1102 connects the FM modulator 1101 and the optical transmitter 1104 to each other, and an optical transmission line 1105 connects the optical transmitter 1104 and the optical receiver 1106 to each other.

The operation of the conventional optical transmission system in the above configuration will be described below. The multiplexer 1100 frequency-division-multiplexes a plurality of signals, and outputs the resultant signal to the FM modulator 1101. The FM modulator 1101 converts the frequency-division-multiplexed signal into a frequency-modulated signal (hereinafter, referred to as "FM modulated signal") having a predetermined frequency deviation through frequency modulation. After that, the FM modulator 1101 outputs the FM modulated signal to the electrical transmission line 1102. The optical transmitter 1104 receives the FM modulated signal through the electrical transmission line 1102, then converts the signal into an optical signal, and sends the optical signal to the optical transmission line 1105. The optical receiver 1106 receives the optical signal through the optical transmission line 1105, then converts the signal into an FM modulated signal which is an electrical signal, and outputs the FM modulated signal to the FM demodulator 1107. The FM demodulator 1107 demodulates the FM modulated signal to reproduce the original frequency-division-multiplexed signal.

The optical transmission system in the above configuration is described in detail in "Optical Super Wide-Band FM Modulation Scheme and Its Application to Multi-Channel AM Video Transmission Systems" by K. Kikushima et al. (IOOC'95 Technical Digest, Vol. 5 PD2-7, pp.33–34), and other documents. The optical transmission system converts a frequency-division-multiplexed signal into an FM modulated signal, and then optically transmits and demodulates the FM modulated signal to reproduce the original frequency-division-multiplexed signal. The optical transmission system utilizes an FM gain in the FM transmission to improve the signal-to-noise power ratio (SNR) of the demodulated signal (i.e., the frequency-division-multiplexed signal), thereby enabling high-quality signal transmission.

Thus, the above-described optical transmission system can realize high-quality multi-channel signal transmission with an optical fiber.

However, the above-described system for optically transmitting an FM modulated signal has the following specific problems due to the properties of the FM modulated signal and the nonlinearity of an optical fiber.

SUMMARY OF THE INVENTION

An FM modulation scheme increases a frequency deviation to acquire a greater FM gain, thereby enabling signal transmission of higher quality than other modulation schemes such as amplitude modulation. On the other hand, the increased frequency deviation requires a wider signal band. In addition, in the FM modulation scheme, linear distortion tends to occur under the influence of the group delay characteristic of a transmission line and the like (the characteristic that a propagation delay varies depending on a frequency). Therefore, the transmission line must be designed with particular attention. However, as a signal band becomes wider, the group delay variations in the band become more difficult to sufficiently suppress.

In a general optical modulation scheme, the optical frequency spectrum, of an optical signal is composed of a steep-shaped optical carrier component, which has narrow spectral line-width, and upper and lower sidebands, as shown in FIG. 12B. The upper and lower sidebands are geometrically similar to the frequency spectrum of a modulating signal. Therefore, if a wide-band signal like an FM modulated signal is used as a modulating signal in optical modulation, the optical frequency spectrum of the optical signal also becomes wider. The optical signal having such wide optical frequency spectrum becomes susceptible to the chromatic-dispersion of an optical fiber (the characteristic that a propagation delay varies depending on a wavelength). The affected optical signal component interacts with the optical carrier component to induce harmonic distortion in the FM modulated signal, resulting in waveform deterioration of the transmitted signal.

As is known from the above, the conventional optical transmission system has the specific problem that the quality of the transmitted signal is degraded due to the wide-band property of an FM modulated signal.

Therefore, an object of the present invention is to provide an optical transmission system capable of narrowing the bandwidth of an FM modulated signal while increasing the frequency deviation thereof to realize high-quality signal transmission. The present invention has the following features to attain the object above.

A first aspect of the present invention is directed to a transmission system for optically transmitting a frequency-division-multiplexed signal, which is obtained by frequency-division multiplexing a plurality of signals, from a transmitting end to a receiving end. The transmission system comprises at the transmitting end, a multiplexer for frequency-division multiplexing the plurality of signals to produce the frequency-division-multiplexed signal, an FM modulator for converting the frequency-division-multiplexed signal into a frequency-modulated signal through frequency modulation using the frequency-division-multiplexed signal as an original signal to output the frequency-modulated signal as an FM modulated signal, and an optical transmitter for converting the FM modulated signal into an optical-intensity-modulated signal whose optical carrier component is suppressed in the optical frequency spectrum through optical modulation using the FM modulated signal as an original signal to send the optical-intensity-modulated signal to the receiving end. The transmission system also comprises at the receiving end, an optical receiver for receiving the optical-intensity-modulated signal from the optical transmitter, and converting the optical-intensity-modulated signal into an electrical signal corresponding to the FM modulated signal through photodetection based on a square-law detection characteristic to output the electrical signal as a received FM modulated signal, and an FM demodulator for demodulating the received FM modulated signal to reproduce the frequency-division-multiplexed signal.

As described above, in the first aspect, the FM modulated signal is obtained through frequency modulation using a frequency-division-multiplexed signal as an original signal. The FM modulated signal is converted into an optical-intensity-modulated signal at the transmitting end. The optical-intensity-modulated signal has an optical frequency spectrum in which upper and lower sidebands distribute geometrically similarly to the frequency spectrum of the original signal for the optical modulation and in which an optical carrier component is suppressed. Then, the optical-intensity-modulated signal is photodetected based on a square-law detection characteristic at the receiving end. At the receiving end, the optical transmission system thus obtains an FM modulated signal, having a frequency deviation twice as large as the one of the original FM modulated signal produced at the transmitting end, as a received FM modulated signal. In this manner, the optical transmission system can narrow (reduce in half) the bandwidth of the FM modulated signal at the transmitting end while securing the frequency deviation thereof large enough to acquire a sufficient FM gain in FM demodulation. As a result, it is possible to prevent the waveform of the transmitted signal from being deteriorated due to the group delay characteristic of the electrical transmission line and the chromatic-dispersion of the optical transmission line, and to realize signal transmission of good quality.

According to a second aspect, in the first aspect, the optical transmitter includes a light source for outputting an unmodulated light, and an optical modulator for modulating the unmodulated light with the FM modulated signal to produce the optical-intensity-modulated signal. The optical modulator has the Mach-Zehnder interferometer structure with a predetermined input-voltage vs. output-optical-power characteristic, and is biased in the input-voltage vs. output-optical-power characteristic such that the output optical power is at the minimum.

As stated above, in the second aspect, the optical modulator used herein is an external optical modulator having the Mach-Zehnder interferometer structure. A modulating signal (an FM modulated signal) is applied to the optical modulator with respect to the "valley" where the output optical power is at the minimum in the input-voltage vs. output-optical-power characteristic (which is periodic like a sine wave) of the optical modulator. The optical modulator thus produces an optical-intensity-modulated signal whose optical carrier component is suppressed. The suppression of the optical carrier component prevents the waveform from being deteriorated by the chromatic-dispersion of the optical transmission line. In addition, the optical-intensity-modulated signal has an optical frequency spectrum in which upper and lower sidebands distribute geometrically similarly to the frequency spectrum of the original signal for the optical modulation. Therefore, after the optical-intensity-modulated signal is square-law detected at the receiving end, the frequency deviation of the FM modulated signal is doubled, thereby making it possible to realize high-quality signal transmission.

According to a third aspect, in the second aspect, the transmission system further comprises a frequency-divider provided between the FM modulator and the optical transmitter for converting the FM modulated signal outputted from the FM modulator into a frequency-divided FM modulated signal whose frequency is $\frac{1}{2^n}$ the frequency of the FM modulated signal, the n being an integer of not less than 1, wherein the optical modulator modulates the unmodulated light with the frequency-divided FM modulated signal to produce the optical-intensity-modulated signal.

As described above, in the third aspect, the optical transmission system previously produces in the FM modulator an FM modulated signal having a frequency deviation larger enough to acquire a desired FM gain. The optical transmission system then converts the FM modulated signal into a frequency-divided FM modulated signal, and next converts the frequency-divided FM modulated signal into an optical-intensity-modulated signal for transmission. This reduces the phase noise in the FM modulated signal to be optically transmitted and FM demodulated. As a result, high-quality signal transmission can be realized.

According to a fourth aspect, in the first aspect, the optical transmitter includes a light source for outputting an unmodulated light, an optical branching circuit for branching the unmodulated light fed from the light source into first and second unmodulated lights, an optical modulator for modulating the first unmodulated light with the FM modulated signal to produce the optical-intensity-modulated signal, the optical modulator having the Mach-Zehnder interferometer structure with a predetermined input-voltage vs. output-optical-power characteristic, and being biased in the input-voltage vs. output-optical-power characteristic such that the output optical power is at the maximum, and an optical combining circuit for combining the optical-intensity-modulated signal produced by the optical modulator and the second unmodulated light to cancel the optical carrier component of the optical-intensity-modulated signal with the second unmodulated light and output the optical-intensity-modulated signal whose optical carrier component is suppressed.

As described above, in the fifth aspect, the optical-intensity-modulated signal produced by the optical modulator is combined with the second unmodulated light set in an opposite phase to the optical carrier component of the optical-intensity-modulated signal. The optical carrier component of the optical-intensity-modulated signal is thus canceled by the second unmodulated light. As a result, it is possible to produce an optical-intensity-modulated signal whose optical carrier component is suppressed.

According to a sixth aspect, in the fourth aspect, the transmission system further comprises a frequency-divider provided between the FM modulator and the optical transmitter for converting the FM modulated signal outputted from the FM modulator into a frequency-divided FM modulated signal whose frequency is $\frac{1}{2^n}$ the frequency of the FM modulated signal, the n being an integer of not less than 1, wherein the optical modulator modulates the first unmodulated light with the frequency-divided FM modulated signal to produce the optical-intensity-modulated signal.

As stated above, in the sixth aspect, as in the third aspect, the optical transmission system previously produces in the FM modulator an FM modulated signal having a frequency deviation larger enough to acquire a desired FM gain, then converts the FM modulated signal into a frequency-divided FM modulated signal, and converts the signal into an optical-intensity-modulated signal for transmission. It is therefore possible to reduce the phase noise in the FM modulated signal to be optically transmitted and FM demodulated.

According to a seventh aspect, in the first aspect, the transmission system further comprises a frequency-divider provided between the FM modulator and the optical transmitter for converting the FM modulated signal outputted from the FM modulator into a frequency-divided FM modulated signal whose frequency is $\frac{1}{2}^n$ the frequency of the FM modulated signal, the n being an integer of not less than 1, wherein the optical transmitter includes an optical modulator for producing the optical-intensity-modulated signal through the optical modulation using the frequency-divided FM modulated signal as an original signal.

As described above, in the seventh aspect, the optical transmission system previously produces in the FM modulator an FM modulated signal having a frequency deviation larger enough to acquire a desired FM gain, then converts the FM modulated signal into a frequency-divided FM modulated signal, and next converts the signal into an optical-intensity-modulated signal for transmission. It is therefore possible to reduce the phase noise in the FM modulated signal to be optically transmitted and FM demodulated.

An eighth aspect of the present invention is directed to an transmitter for use in a transmission system for optically transmitting a frequency-division-multiplexed signal, which is obtained by frequency-division-multiplexing a plurality of signals, from a transmitting end to a receiving end. The transmitter comprises a multiplexer for frequency-division multiplexing the plurality of signals to produce the frequency-division-multiplexed signal, an FM modulator for converting the frequency-division-multiplexed signal into a frequency-modulated signal through frequency modulation using the frequency-division-multiplexed signal as an original signal to output the frequency-modulated signal as an FM modulated signal, and an optical transmitter for converting the FM modulated signal into an optical-intensity-modulated signal whose optical carrier component is suppressed in the optical frequency spectrum through optical modulation using the FM modulated signal as an original signal to send the optical-intensity-modulated signal to the receiving end.

According to a ninth aspect, in the eighth aspect, the optical transmitter includes a light source for outputting an unmodulated light, and an optical modulator for modulating the unmodulated light with the FM modulated signal to produce the optical-intensity-modulated signal, the optical modulator having the Mach-Zehnder interferometer structure with a predetermined input-voltage vs. output-optical-power characteristic, and being biased in the input-voltage vs. output-optical-power characteristic such that the output optical power is at the minimum.

According to a tenth aspect, in the ninth aspect, the transmitter further comprises a frequency-divider provided between the FM modulator and the optical transmitter for converting the FM modulated signal outputted from the FM modulator into a frequency-divided FM modulated signal whose frequency is $\frac{1}{2}^n$ the frequency of the FM modulated signal, the n being an integer of not less than 1, wherein the optical modulator modulates the unmodulated light with the frequency-divided FM modulated signal to produce the optical-intensity-modulated signal.

According to an eleventh aspect, in the eighth aspect, the optical transmitter includes a light source for outputting an unmodulated light, an optical branching circuit for branching the unmodulated light fed from the light source into first and second unmodulated lights, an optical modulator for modulating the first unmodulated light with the FM modulated signal to produce the optical intensity-modulated signal, the optical modulator having the Mach-Zehnder interferometer structure with a predetermined input-voltage vs. output-optical-power characteristic, and being biased in the input-voltage vs. output-optical-power characteristic such that the output optical power is at the maximum, and an optical combining circuit for combining the optical-intensity-modulated signal produced by the optical modulator and the second unmodulated light to cancel the optical carrier component of the optical-intensity-modulated signal with the second unmodulated light, and output the optical-intensity-modulated signal whose optical carrier component is suppressed.

According to a thirteenth aspect, in the eleventh aspect, the transmitter further comprises a frequency-divider provided between the FM modulator and the optical transmitter for converting the FM modulated signal outputted from the FM modulator into a frequency-divided FM modulated signal whose frequency is $\frac{1}{2}^n$ the frequency of the FM modulated signal, the n being an integer of not less than 1, wherein the optical modulator modulates the first unmodulated light with the frequency-divided FM modulated signal to produce the optical-intensity-modulated signal.

According to a fourteenth aspect, in the eighth aspect, the transmitter further comprises a frequency-divider provided between the FM modulator and the optical transmitter for converting the FM modulated signal outputted from the FM modulator into a frequency-divided FM modulated signal whose frequency is $\frac{1}{2}^n$ the frequency of the FM modulated signal, the n being an integer of not less than 1, wherein the optical transmitter includes an optical modulator for producing the optical-intensity-modulated signal through optical modulation using the frequency-divided FM modulated signal as an original signal.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing the configuration of an optical transmission system according to a first embodiment of the present invention;

FIG. 8 is a block diagram showing the configuration of an optical transmission system according to a fourth embodiment;

FIG. 9 is a schematic diagram used to explain optical modulation performed by an optical modulator in the optical transmission system according to the fourth embodiment;

DESCRIPTION OF THE PREFERRED EMBODIMENTS

First Embodiment

Figure 2A:
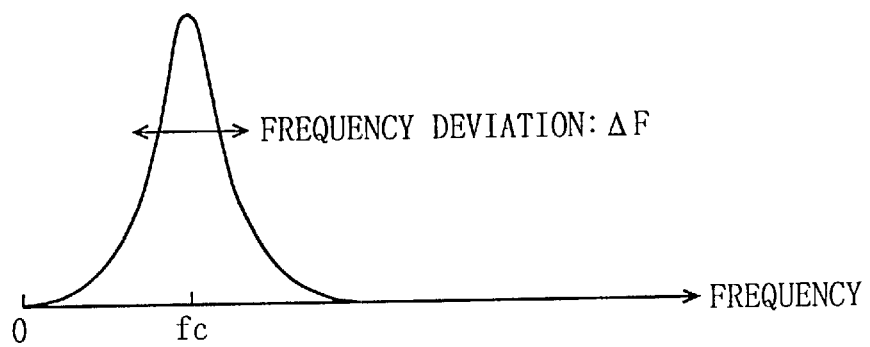
FIG. 2A is a schematic diagram showing the frequency spectrum of an FM modulated signal outputted from an FM modulator in the optical transmission system according to the first embodiment.

FIG. 1 shows the configuration of a system for optically transmitting a frequency-division-multiplexed signal according to a first embodiment of the present invention. Referring to FIG. 1, the optical transmission system of the present embodiment comprises a multiplexer 100, an FM modulator 101, a light source 103, an optical modulator 104, an optical receiver 106, and an FM demodulator 107. In the optical transmission system, an electrical transmission line 102 connects the FM modulator 101 and the optical modulator 104 to each other, and an optical transmission line 105 connects the optical modulator 104 and the optical receiver 106 to each other. The optical transmission system transmits an optical signal, which is produced in a below described manner, from a transmitting end to a receiving end through the optical transmission line 105. At the transmitting end, the light source 103 and the optical modulator 104 constitute an optical transmitter 20a, and the optical transmitter 20a, the multiplexer 100, and the FM modulator 101 constitute a transmitter 10a. In addition, the optical receiver 106 at the receiving end is constituted by a photodetector such as photodiode for converting an optical signal into an electrical signal through photodetection based on a square-law detection characteristic, and a preamplifier for amplifying the electrical signal fed from the photodetector.

Figure 2B:
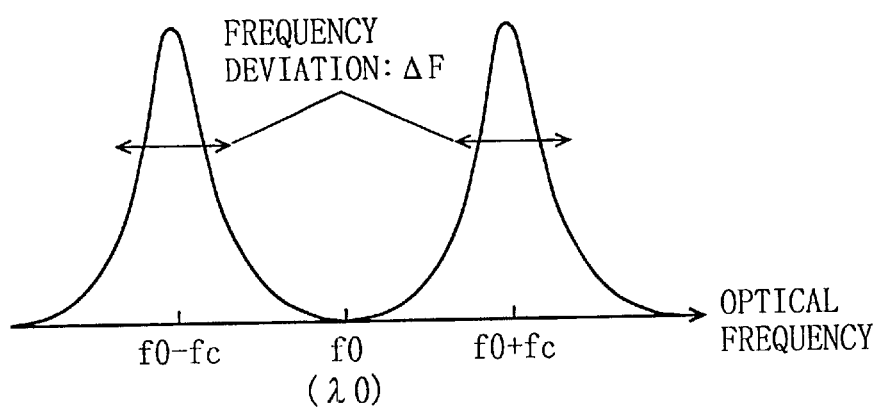
FIG. 2B is a schematic diagram showing the optical frequency spectrum of an optical signal outputted from an optical modulator in the optical transmission system according to the first embodiment.
Figure 2C:
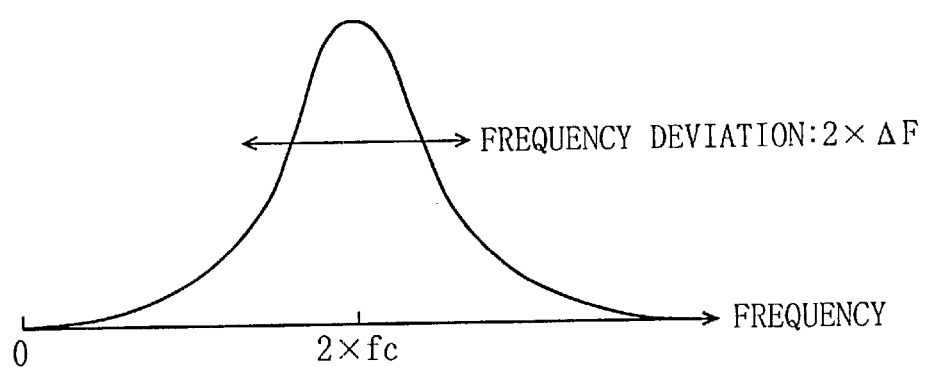
FIG. 2C is a schematic diagram showing the frequency spectrum of an FM modulated signal outputted from an optical receiver in the optical transmission system according to the first embodiment.
Figure 3:
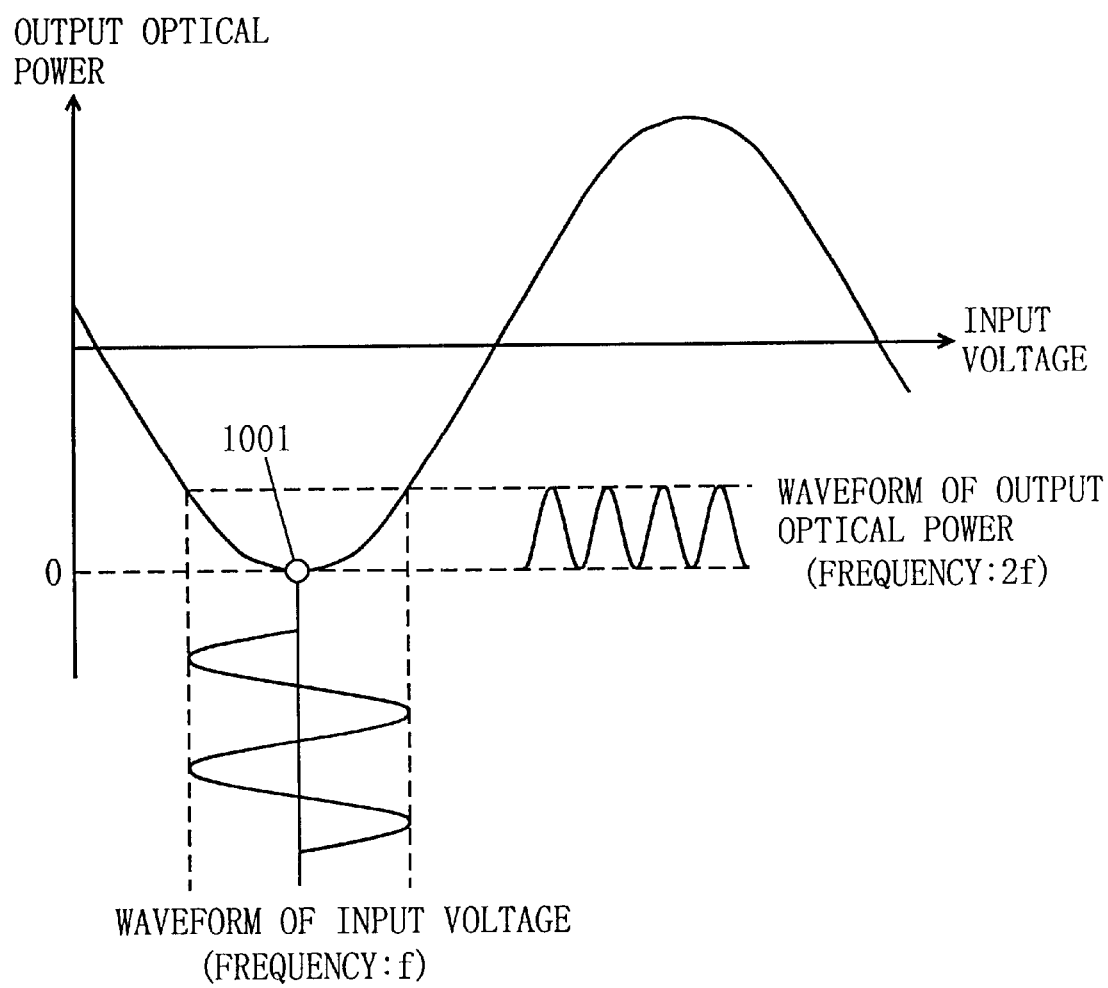
FIG. 3 is a schematic diagram used to explain optical modulation performed by the optical modulator in the optical transmission system according to the first embodiment.

Next, referring to FIGS. 2A to 2C, the operation of the present embodiment shown in FIG. 1 is described. FIGS. 2A to 2C schematically illustrate the frequency spectrums of respective signals in the optical transmission system in FIG. 1. FIG. 2A shows the frequency spectrum of an output signal of the FM modulator 101. FIG. 2B shows the optical frequency spectrum of an output signal (optical signal) of the optical modulator 104. FIG. 2C shows the frequency spectrum of an output signal of the optical receiver 106. In the optical transmission system shown in FIG. 1, the multiplexer 100 frequency-division multiplexes a plurality of signals, and outputs the resultant signal to the FM modulator 101. The FM modulator 101 converts the frequency-division-multiplexed signal into an FM modulated signal through frequency modulation. The FM modulated signal has a frequency spectrum as shown in FIG. 2A in which a carrier frequency is fc and a frequency deviation is ΔF. After that, the FM modulator outputs the FM modulated signal to the electrical transmission line 102. The light source 103 outputs an unmodulated light. The optical modulator 104 receives the unmodulated light from the light source 103 and the FM modulated signal through the electrical transmission line 102, then modulates the unmodulated light with the FM modulated signal, and outputs an optical signal whose optical carrier component is suppressed. The optical modulator 104 has the Mach-Zehnder interferometer structure, for example, and is biased at the "valley" in its input-voltage vs. output-optical-power characteristic, where the output optical power is at the minimum, as shown in FIG. 3. The FM modulated signal is applied to the optical modulator 104 with respect to the voltage of an operating point 1001 which is set by the above-mentioned bias. The optical modulator 104 thus produces an optical-intensity-modulated signal (hereinafter, referred to as "optical signal") having the optical frequency spectrum in which an optical carrier component is suppressed as shown in FIG. 2B. The optical receiver 106 receives the optical signal through the optical transmission line 105, and square-law detects the signal to convert into an FM modulated signal having the frequency spectrum as shown in FIG. 2C, that is, an FM modulated signal whose carrier frequency is 2fc and whose frequency deviation is 2* ΔF. The optical receiver 106 then outputs the FM modulated signal to the FM demodulator 107. The FM demodulator 107 demodulates the FM modulated signal to reproduce the original frequency-division-multiplexed signal.

An FM modulation scheme can raise an FM gain by increasing a frequency deviation, and improve the signalto-noise ratio (SNR) of a demodulated signal. On the other hand, the increase in frequency deviation extends the spectrum bandwidth of an FM modulated signal, and also requires a wider band of a transmission line. The group delay characteristic of the transmission line with such wide band affects the FM modulated signal, to cause linear distortion thereof in some cases. That is, as the bandwidth of an FM modulated signal is wider, waveform distortion thereof increases. In short, a frequency deviation in FM modulated signal transmission has a trade-off relation between noise characteristic and waveform distortion of an FM modulated signal. Hence, the wide-band FM transmission system is difficult to optimally design.

The optical transmission system in FIG. 1 converts an FM modulated signal into an optical signal whose optical carrier is suppressed, and then optically transmits and square-law detects the optical signal, thus producing an FM modulated signal having a frequency deviation (or frequency bandwidth) twice as large as the one of the original FM modulated signal. Therefore, the frequency deviation of the FM modulated signal outputted from the FM modulator 101 is set to be half of the frequency deviation essentially required to acquire a predetermined FM gain in FM demodulation. The optical transmission system thus reduces the bandwidth of the FM modulated signal in half at the transmitting end, and reduces linear distortion caused by the group delay characteristic of the electrical transmission line 102 and the like while securing the predetermined FM gain. Moreover, the optical transmission system suppresses the optical carrier level of the optical signal, thereby suppressing waveform deterioration due to the chromatic-dispersion of the optical fiber transmission line. As is clear from the above, the optical transmission system of the present embodiment can realize high-quality signal transmission, and facilitate implementation of a transmission line to reduce the cost of the entire system.

Second Embodiment

Figure 4:
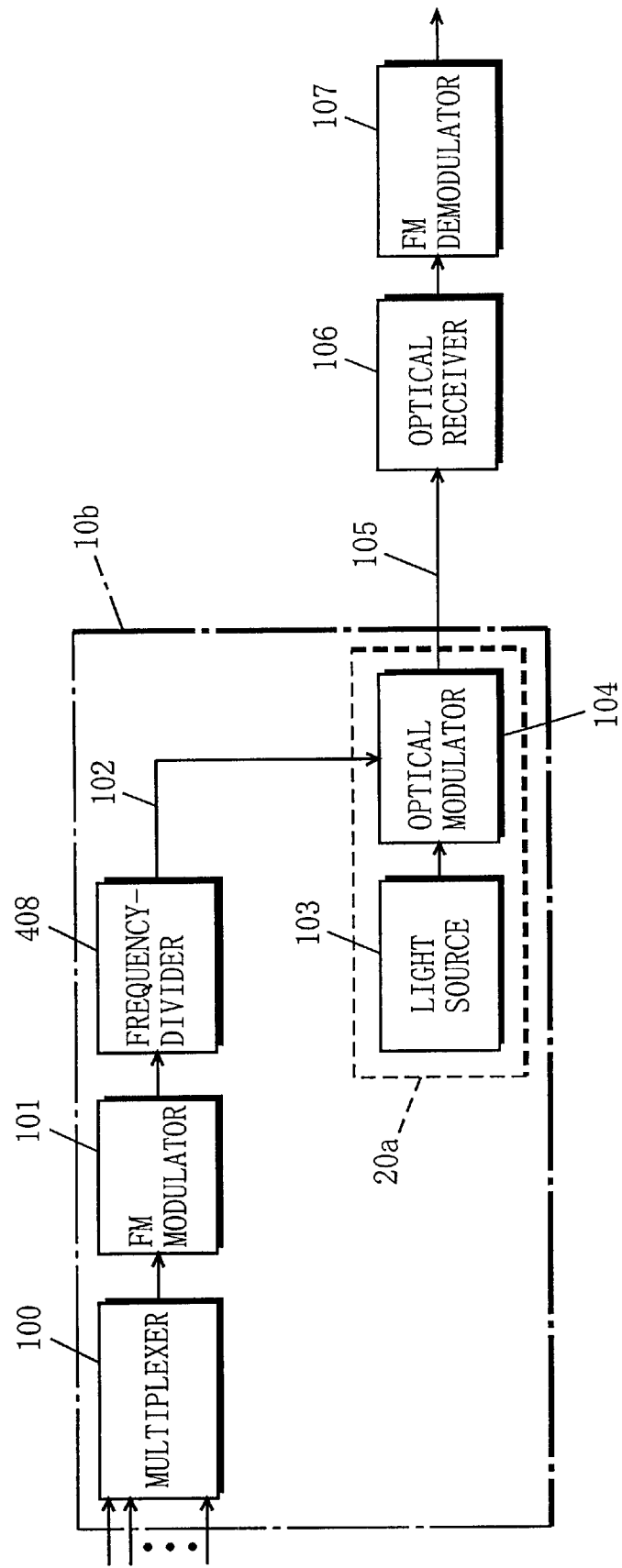
FIG. 4 is a block diagram showing the configuration of an optical transmission system according to a second embodiment of the present invention.

FIG. 4 shows the configuration of an optical transmission system of an FM modulated signal according to a second embodiment of the present invention. Referring to FIG. 4, the optical transmission system of the present embodiment comprises the multiplexer 100, the FM modulator 101, the light source 103, the optical modulator 104, the optical receiver 106, the FM demodulator 107, and a frequency-divider 408. In the optical transmission system, the electrical transmission line 102 connects the frequency-divider 408 and the optical modulator 104 to each other, and the optical transmission line 105 connects the optical modulator 104 and the optical receiver 106 to each other. The configuration of the second embodiment is different from that of the above-described first embodiment only in including the frequency-divider 408. Therefore, the constituents identical to those in the first embodiment are assigned the same reference numerals, and the description thereof is simplified herein. The difference from the first embodiment is mainly described below. Note that at the transmitting end of the optical transmission system of the present embodiment, the light source 103 and the optical modulator 104 constitute the optical transmitter 20a, and the optical transmitter 20a, the multiplexer 100, the FM modulator 101, and the frequency-divider 408 constitute the transmitter 10b.

In the above first embodiment, an FM modulated signal is outputted from the FM modulator 101, and then directly applied to the optical modulator 104. On the other hand, in the present embodiment, the frequency-divider 408 divides each frequency component of the FM modulated signal outputted from the FM modulator 101 into $2^n$ (n is an integer of not less than one) Namely, the frequency-divider 408 converts the FM modulated signal into a frequency-divided FM modulated signal whose frequency is $½^n$ the frequency of the FM modulated signal. The frequency-divider 408 then outputs the frequency-divided FM modulated signal to the optical modulator 104.

In an FM modulation scheme, if an oscillator for generating an FM modulated signal has frequency drift, which is called "phase noise",the frequency drift is converted into intensity noise at the FM demodulation to degrade the noise characteristic of the demodulated signal.

The optical transmission system shown in FIG. 4 produces an FM modulated signal having a frequency deviation more than the frequency deviation essentially required to acquire a predetermined FM gain in FM demodulation. Next, the optical transmission system converts the FM modulated signal into a frequency-divided FM modulated signal, and then converts the signal into an optical signal for transmission. The phase noise in the FM modulated signal received at the receiving end is thus reduced.

Figure 5A:
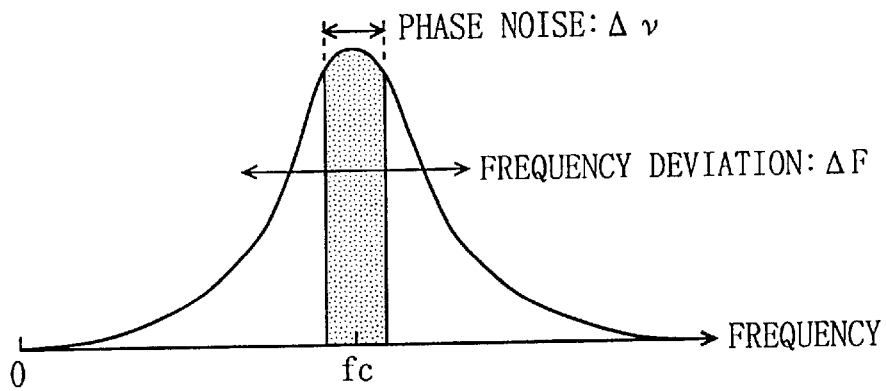
FIG. 5A is a schematic diagram showing the frequency spectrum of an FM modulated signal outputted from an FM modulator in a first operation mode of the optical transmission system according to the second embodiment.
Figure 5B:
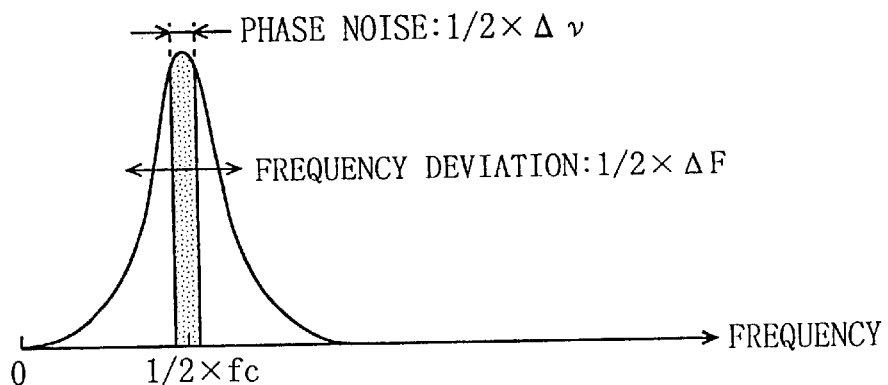
FIG. 5B is a schematic diagram showing the frequency spectrum of an FM modulated signal outputted from a frequency-divider in the first operation mode of the optical transmission system according to the second embodiment.
Figure 5C:
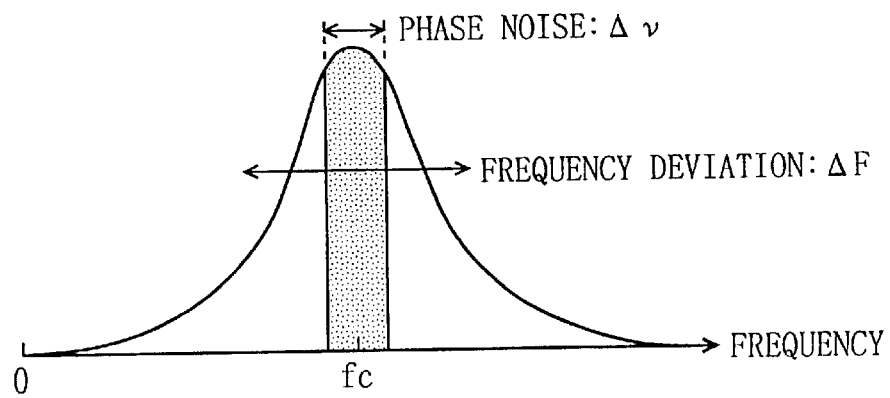
FIG. 5C is a schematic diagram showing the frequency spectrum of an FM modulated signal outputted from an optical receiver in the first operation mode of the optical transmission system according to the second embodiment.

FIGS. 5A to 5C illustrate the operation and advantageous effects of the frequency-divider 408 in a first operation mode of the optical transmission system. FIGS. 5A, 5B, and 5C schematically show the frequency spectrums included in output signals of the FM modulator 101, the frequency-divider 408, and the optical receiver 106, respectively. In the first operation mode, as shown in FIGS. 5A to 5C, the optical transmission system previously produces an FM modulated signal (whose phase noise is $\Delta v$) having a frequency deviation $\Delta F$ equal to a required amount of frequency deviation $\Delta F$ in FM demodulation (FIG. 5A). After that, the FM modulated signal is converted into a frequency-divided FM modulated signal whose frequency is ½ the frequency of the FM modulated signal (FIG. 5B). Then, the frequency-divided FM modulated signal is converted into an optical signal whose optical carrier is suppressed, and square-law detected. As a result, the optical transmission system obtains an FM modulated signal having phase noise $\Delta v$ equal to the one of the original FM modulated signal (FIG. 5C). On the other hand, in the first embodiment, the phase noise of the FM modulated signal becomes twice at the receiving end while the frequency deviation thereof is large (FIG. 2C). Specifically, when the phase noise of the FM modulated signal at the transmitting end is $\Delta v$, it becomes $2*\Delta v$ at the receiving end.

Figure 6A:
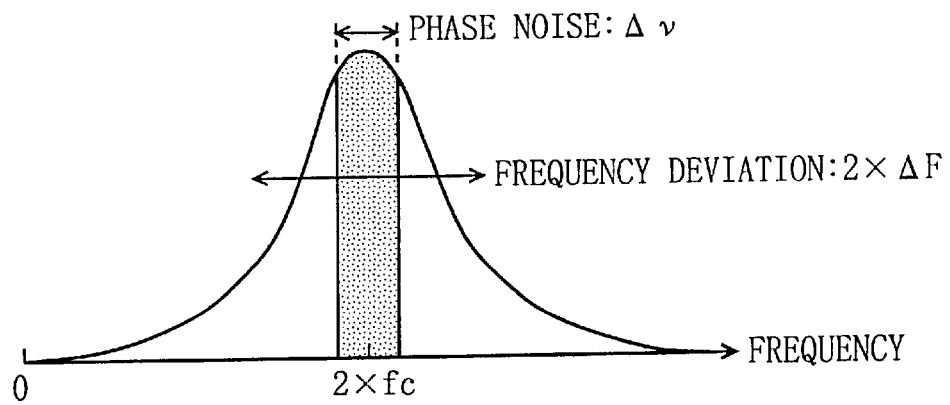
FIG. 6A is a schematic diagram showing the frequency spectrum of an FM modulated signal outputted from the FM modulator in a second operation mode of the optical transmission system according to the second embodiment.
Figure 6B:
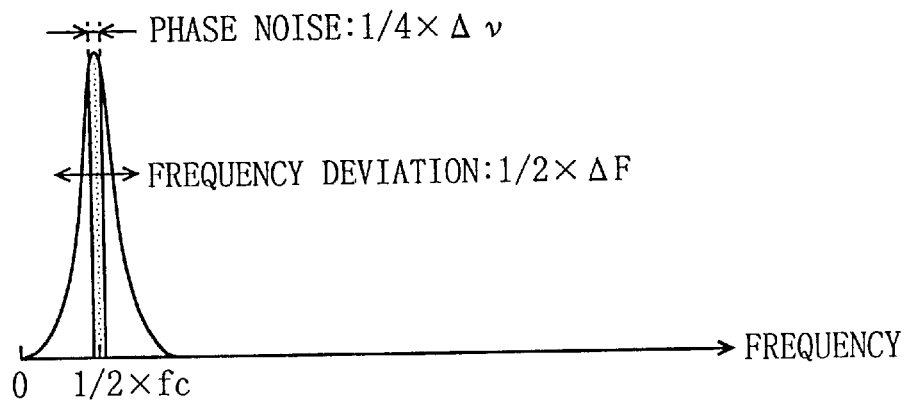
FIG. 6B is a schematic diagram showing the frequency spectrum of an FM modulated signal outputted from the frequency-divider in the second operation mode of the optical transmission system according to the second embodiment.
Figure 6C:
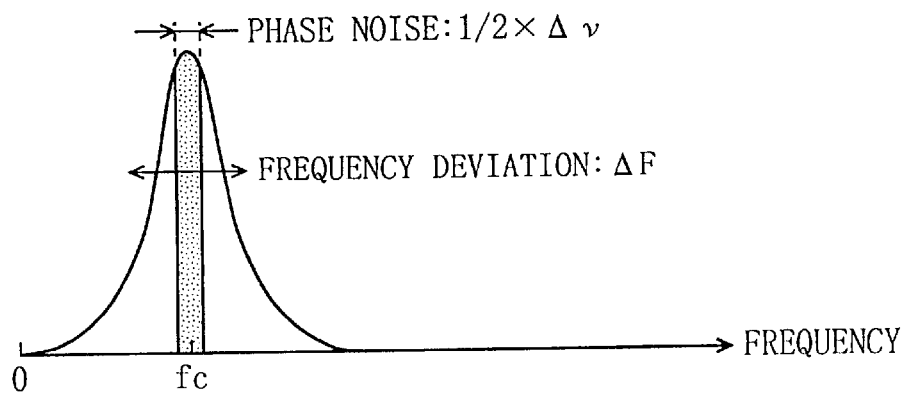
FIG. 6C is a schematic diagram showing the frequency spectrum of the FM modulated signal outputted from the optical receiver in the second operation mode of the optical transmission system according to the second embodiment.

FIGS. 6A to 6C illustrate the operation and advantageous effects of the frequency-divider 408 in a second operation mode of the optical transmission system in FIG. 4. FIGS. 6A, 6B, and 6C schematically show the frequency spectrums included in output signals of the FM modulator 101, the frequency-divider 408, and the optical receiver 106, respectively. In the second operation mode, as shown in FIGS. 6A to 6C, the optical transmission system previously produces an FM modulated signal (whose phase noise is $\Delta v$) having a frequency deviation $2*\Delta F$ twice as large as a required amount of frequency deviation $\Delta F$ in FM demodulation (FIG. 6A). After that, the FM modulated signal is converted into a frequency-divided FM modulated signal whose frequency is ¼ the frequency of the FM modulated signal (FIG. 6B). The frequency-divided FM modulated signal is next converted into an optical signal, then transmitted, and square-law detected. Thus, the optical transmission system can obtain an FM modulated signal whose phase noise is reduced in half of the one of the original FM modulated signal (i.e., the phase noise after transmission becomes $½*\Delta v$) (FIG. 6C)

As is clear from the above, the optical transmission system of the present embodiment can reduce the phase noise in the FM modulated signal after transmission, thereby realizing signal transmission of better quality.

Third Embodiment

Figure 7:
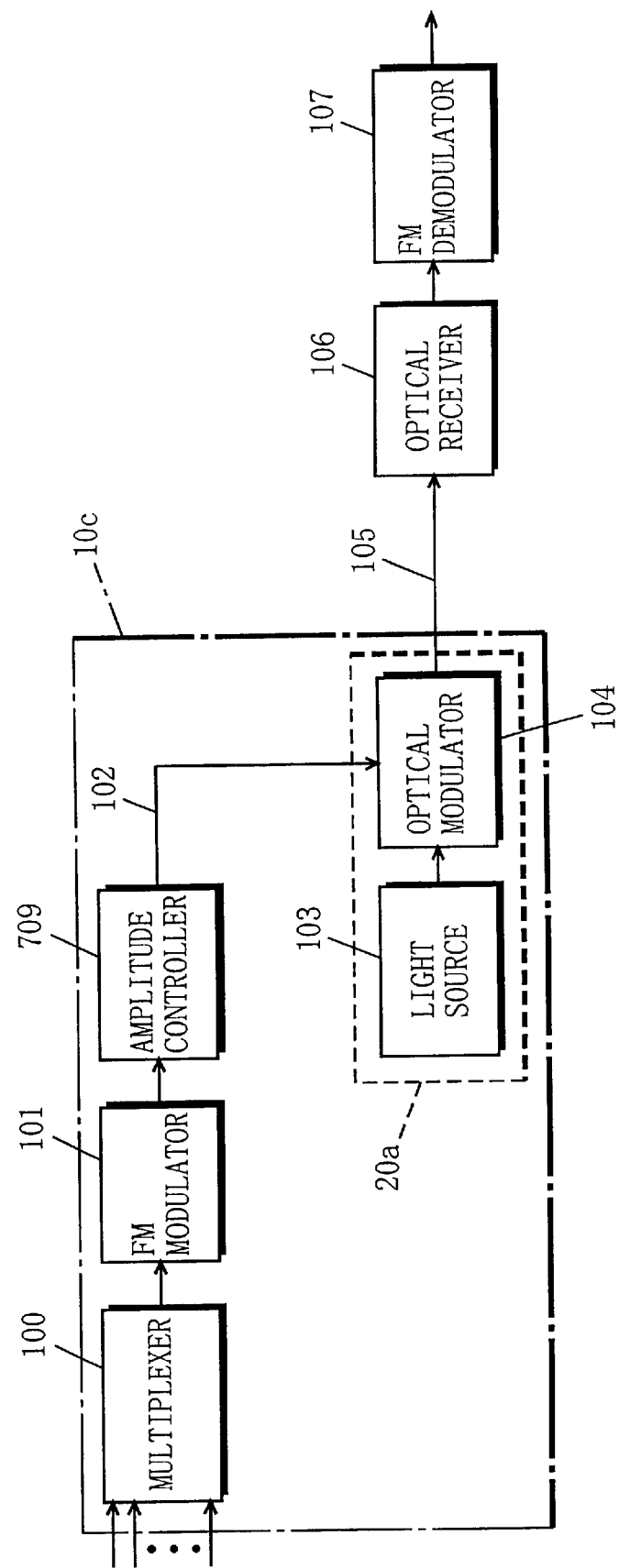
FIG. 7 is a block diagram showing the configuration of an optical transmission system according to a third embodiment.

FIG. 7 shows the configuration of an optical transmission system of an FM modulated signal according to a third embodiment of the present invention. Referring to FIG. 7, the optical transmission system of the present embodiment comprises the multiplexer 100, the FM modulator 101, the light source 103, the optical modulator 104, the optical receiver 106, the FM demodulator 107, and an amplitude controller 709. In the optical transmission system, the electrical transmission line 102 connects the amplitude controller 709 and the optical modulator 104 to each other, and the optical transmission line 105 connects the optical modulator 104 and the optical receiver 106 to each other. The configuration of the third embodiment is different from that of the first embodiment in including the amplitude controller 709. Therefore, the constituents identical to those of the first embodiment are assigned the same reference numerals, and the description thereof is simplified herein. The difference from the first embodiment is mainly described below. Note that at the transmitting end of the optical transmission system of the present embodiment, the light source 103 and the optical modulator 104 constitute the optical transmitter 20a, and the optical transmitter 20a, the multiplexer 100, the FM modulator 101, and the amplitude controller 709 constitute the optical transmitter 10c.

In the above first embodiment, an FM modulated signal is outputted from the FM modulator 101, and directly applied to the optical modulator 104. On the other hand, in the present embodiment, the amplitude controller 709 removes variations in amplitude of the FM modulated signal to adjust the amplitude to consistently remain constant, and then outputs the FM modulated signal to the optical modulator 104.

As described in the above, in the optical transmission system in FIG. 7, the amplitude of an FM modulated signal to be applied to the optical modulator 104 consistently remains constant. Accordingly, the optical transmission system can avoid the influence of the nonlinearity in electrical-to-optical conversion performed by the optical modulator 104, and prevent the signal quality from being degraded in FM demodulation performed by the FM demodulator 107. Consequently, it is possible to realize high-quality signal transmission.

Fourth Embodiment

FIG. 8 shows the configuration of an optical transmission system of an FM modulated signal according to a fourth embodiment of the present invention. Referring to FIG. 8, the optical transmission system of the present embodiment comprises the multiplexer 100, the FM modulator 101, the light source 103, the optical receiver 106, the FM demodulator 107, an optical modulator 804, an optical branching circuit 810, an optical combining circuit 811, and an optical delay circuit 812. In the optical transmission system, the electrical transmission line 102 connects the FM modulator 101 and optical modulator 104 to each other, and the optical transmission line 105 connects the optical combining circuit 811 and the optical receiver 106 to each other. The fourth embodiment is different from the first embodiment in including the optical branching circuit 810, the optical combining circuit 811, and the optical delay circuit 812. In addition, the conditions for optical modulation performed by the optical modulator 804 are different from those of the optical modulator 104 in the first embodiment. Therefore, the constituents identical to those in the first embodiment are assigned the same reference numerals, and the description thereof is simplified herein. The difference from the first embodiment is mainly described below. Note that at the transmitting end of the optical transmission system of the present embodiment, the light source 103, the optical branching circuit 810, the optical modulator 804, the optical combining circuit 811, and the optical delay circuit 812 constitute the optical transmitter 20b, and the optical transmitter 20b, the multiplexer 100, and the FM modulator 101 constitute the transmitter 10d.

Figure 10A:
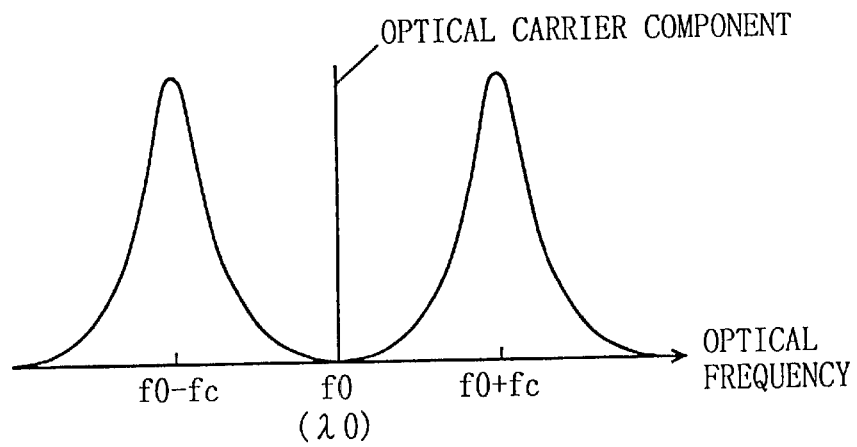
FIG. 10A is a schematic diagram showing the optical frequency spectrum of an optical signal outputted from the optical modulator in the optical transmission system according to the fourth embodiment.
Figure 10B:
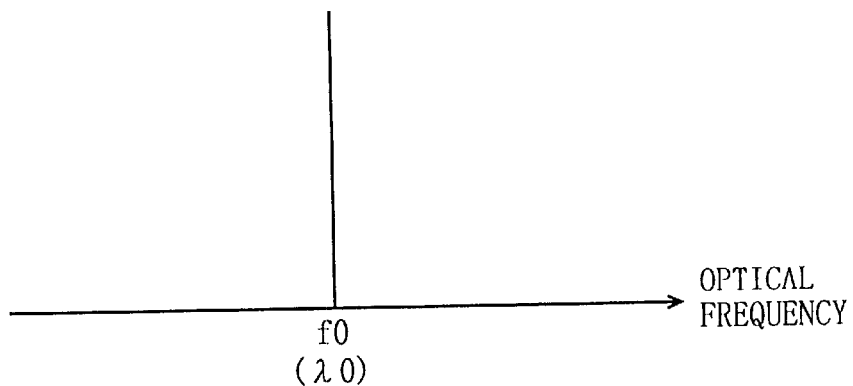
FIG. 10B is a schematic diagram showing the optical frequency spectrum of a light outputted from an optical branching circuit in the optical transmission system according to the fourth embodiment.
Figure 10C:
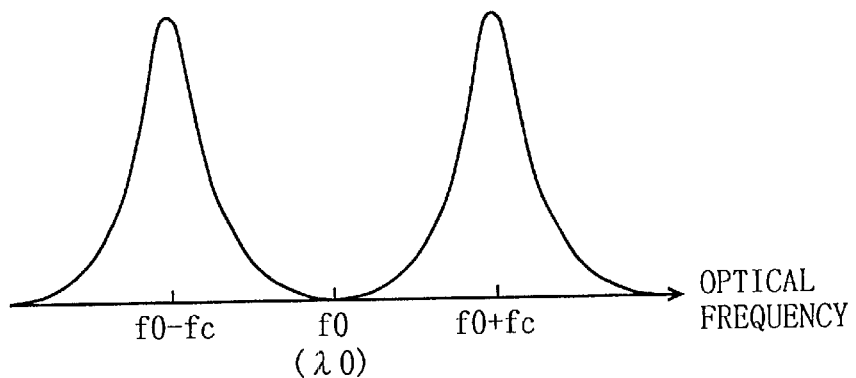
FIG. 10C is a schematic diagram showing the optical frequency spectrum of an optical signal outputted form an optical combining circuit in the optical transmission system according to the fourth embodiment.
Figure 11:
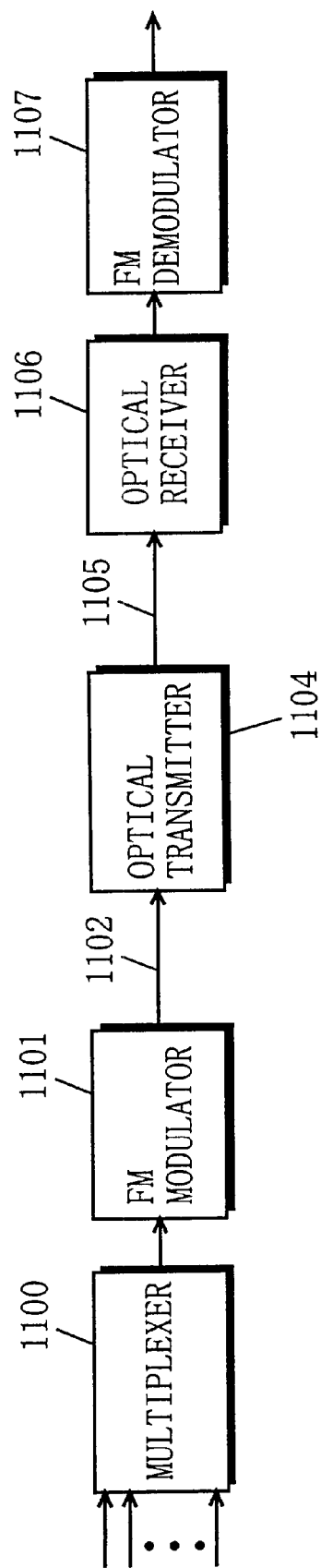
FIG. 11 is a block diagram showing the configuration of a conventional optical transmission system.
Figure 12A:
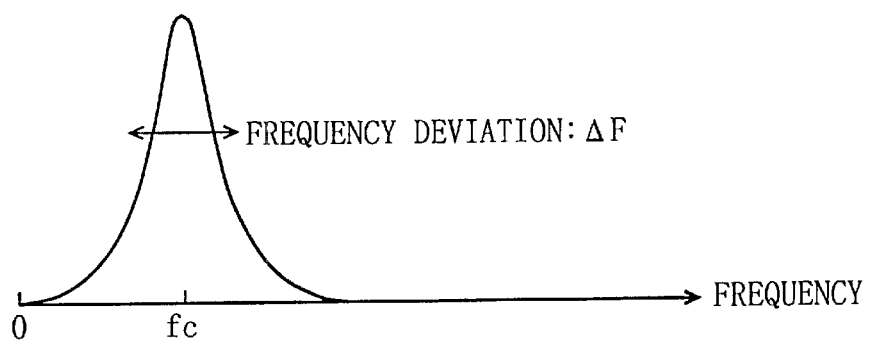
FIG. 12A is a schematic diagram showing the frequency spectrum of an FM modulated signal outputted from an FM modulator in the optical transmission system in FIG. 11.
Figure 12B:
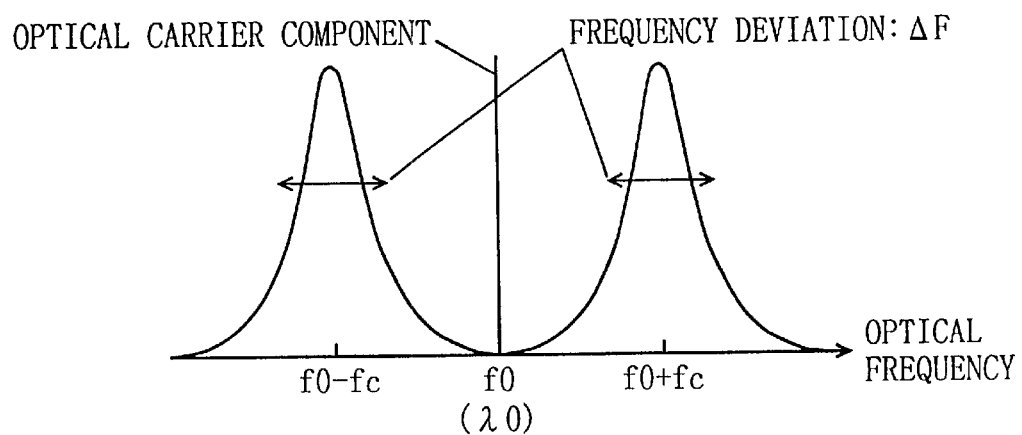
FIG. 12B is a schematic diagram showing the optical frequency spectrum of an optical signal outputted from an optical transmitter in the optical transmission system in FIG. 11.
Figure 12C:
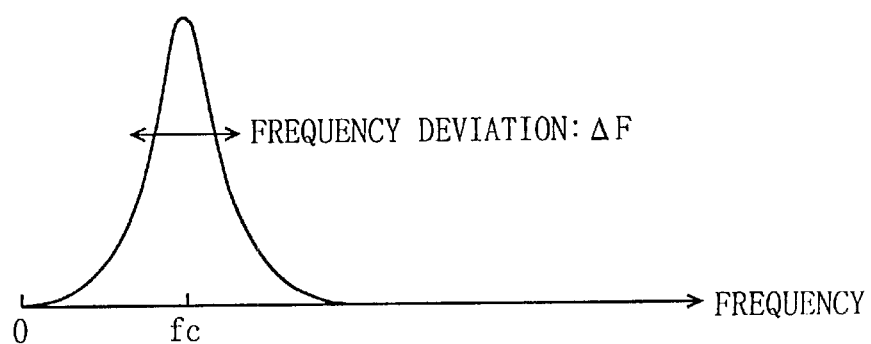
FIG. 12C is a schematic diagram showing the frequency spectrum of an FM modulated signal outputted from an optical receiver in the optical transmission system in FIG. 11.

In the above-described first embodiment, the optical modulator 104 is biased at the "valley" in its input-voltage vs. output-optical-power characteristic to produce an optical signal whose optical carrier is suppressed. However, in the present embodiment, the optical modulator 804 is biased in its input-voltage vs. output-optical-power characteristic at the "peak" where the output optical power is at the maximum, as shown in FIG. 9. An FM modulated signal is applied to the optical modulator 804 with respect to the voltage of an operating point 1002 which is set by the above-mentioned bias. The optical modulator 804 thus produces an optical-intensity-modulated signal (hereinafter, referred to as "optical signal") having an optical frequency spectrum as shown in FIG. 10A. The optical branching circuit 810 receives an unmodulated light (shown in FIG. 10B) from the light source 103, and branches the light into a first unmodulated light La and a second unmodulated light Lb. The first unmodulated light La is outputted to the optical modulator 804, and converted into an optical signal through optical modulation using the FM modulated signal outputted from the FM modulator 101 as an original signal. The second unmodulated light Lb is outputted through the optical delay circuit 812 to the optical combining circuit 811, and combined therein with the optical signal outputted from the optical modulator 804. The optical delay circuit 812, after receiving the second unmodulated light Lb, controls a propagation delay thereof to set the second unmodulated light Lb in a precisely opposite phase to the optical signal outputted from the optical modulator 804. Thus, in the optical combining circuit 811, the optical carrier component of the optical signal outputted from the optical modulator 804 is canceled by the unmodulated light outputted from the optical delay circuit 812. Consequently, the optical transmission system produces an optical signal having the optical frequency spectrum in which an optical carrier component is suppressed as shown in FIG. 10C.

As is clear from the above, according to the optical transmission system in FIG. 8, the optical carrier component of the optical signal outputted from the optical modulator 804 is cancelled by the unmodulated light Lb which is one of the lights branched from the unmodulated light fed from the light source 103. The optical transmission system thus produces an optical signal whose optical carrier component is suppressed, thereby realizing high-quality signal transmission.

The optical delay circuit 812 is interposed onto the path leading from the optical branching circuit 810 directly to the optical combining circuit 811 in the fourth embodiment, but may be interposed onto the path leading from the optical branching circuit 810 to the optical combining circuit 811 via the optical modulator 804 or interposed onto the both paths, or may be omitted.

In addition, it is possible to apply the change of the conditions for the optical modulation performed by the optical modulator 804, and the change and addition of the configuration accompanied therewith (the optical branching circuit 810, the optical combining circuit 811, and the optical delay circuit 812), all of which are described in the fourth embodiment, to the first embodiment and other embodiments. In such case, the same advantageous effects can be also provided.

While the invention has been described in detail, the foregoing description is in all aspects illustrative and not restrictive. It is understood that numerous other modifications and variations can be devised without departing from the scope of the invention.

What is claimed is:

1. A transmission system for optically transmitting a frequency-division-multiplexed signal, which is obtained by frequency-division multiplexing a plurality of signals, said transmission system comprising:

a transmitting end comprising a multiplexer operable to frequency-division multiplex the plurality of signals to produce the frequency-division multiplexed signal, a FM modulator being operable to convert the frequency-division-multiplexed signal into a frequency-modulated signal through frequency modulation using the frequency-division-multiplexed signal as an original signal to output the frequency-modulated signal as a FM modulated signal, and an optical transmitter operable to convert the FM modulated signal into an optical-intensity-modulated signal whose optical carrier component is suppressed in an optical frequency spectrum through optical modulation using the FM modulated signal as an original signal to send the optical-intensity-modulated signal to a receiving end; and said receiving end comprising an optical receiver operable to receive the optical-intensity-modulated signal from said optical transmitter, and convert the optical-intensity-modulated signal into an electrical signal corresponding to the FM modulated signal through photodetection based on a square-law detection characteristic to the output the electrical signal as a received FM modulated signal, and a FM demodulator operable to demodulate the received FM modulated signal to reproduce the frequency-division-multiplexed signal.

2. The transmission system according to claim 1, wherein said optical transmitter comprises:

a light source being operable to output an unmodulated light; and an optical modulator being operable to modulate the unmodulated light with the FM modulated signal to produce the optical-intensity-modulated signal, said optical modulator having a Mach-Zehnder interferometer structure with a predetermined input-voltage versus output-optical-power characteristic, and being biased in the input-voltage versus output-optical-power characteristic such that an output optical power is at a minimum.

3. The transmission system according to claim 2, further comprising a frequency-divider provided between said FM modulator and said optical transmitter, said frequency-divider being operable to convert the FM modulated signal outputted from said FM modulator into a frequency-divided FM modulated signal whose frequency is $½^n$ of a frequency of the FM modulated signal, the n being an integer of not less than 1, wherein said optical modulator modulates the unmodulated light with the frequency-divided FM modulated signal to produce the optical-intensity-modulated signal.

4. The transmission system according to claim 1, wherein said optical transmitter comprises:

a light source being operable to output an unmodulated light;

an optical branching circuit being operable to branch the unmodulated light fed from said light source into a first unmodulated light and a second unmodulated light;

an optical modulator being operable to modulate the first unmodulated light with the FM modulated signal to produce the optical-intensity-modulated signal, said optical modulator having a Mach-Zehnder interferometer structure with a predetermined input-voltage versus output-optical-power characteristic, and being biased in the input-voltage versus output-optical-power characteristic such that an output optical power is at a maximum; and an optical combining circuit being operable to combine the optical-intensity-modulated signal produced by said optical modulator and the second unmodulated light to cancel an optical carrier component of the optical-intensity-modulated signal with the second unmodulated light and output the optical-intensity-modulated signal whose optical carrier component is suppressed.

5. The transmission system according to claim 4, wherein said optical transmitter further comprises an optical delay circuit provided between said optical branching circuit and said optical combining circuit, said optical delay circuit being operable to adjust a propagation delay of at least one of the first unmodulated light, the second unmodulated light, and the optical-intensity-modulated signal produced by said optical modulator such that the second unmodulated light and the optical carrier component of the optical-intensity-modulated signal produced by said optical modulator are set in opposite phases to each other.

6. The transmission system according to claim 4, further comprising a frequency-divider provided between said FM modulator and said optical transmitter, said frequency-divider being operable to convert the FM modulated signal outputted from said FM modulator into a frequency-divided FM modulated signal whose frequency is $½^n$ of a frequency of the FM modulated signal, n being an integer of not less than 1, wherein said optical modulator modulates the first unmodulated light with the frequency-divided FM modulated signal to produce the optical-intensity-modulated signal.

7. The transmission system according to claim 1, further comprising a frequency-divider provided between said FM modulator and said optical transmitter, said frequency-divider being operable to convert the FM modulated signal outputted from said FM modulator into a frequency-divided FM modulated signal whose frequency is $½^n$ of a frequency of the FM modulated signal, n being an integer of not less than 1, wherein said optical transmitter comprises an optical modulator being operable to produce the optical-intensity-modulated signal through the optical modulation using the frequency-divided FM modulated signal as an original signal.

8. A transmitter for use in a transmission system for optically transmitting a frequency-division-multiplexed signal, which is obtained by frequency-division-multiplexing a plurality of signals, said transmitter comprising:

a multiplexer being operable to frequency-division-multiplex the plurality of signals to produce the frequency-division-multiplexed signal;

a FM modulator being operable to convert the frequency-division-multiplexed signal into a frequency-modulated signal through frequency modulation using the frequency-division-multiplexed signal as an original signal to output the frequency-modulated signal as a FM modulated signal; and an optical transmitter being operable to convert the FM modulated signal into an optical-intensity-modulated signal whose optical carrier component is suppressed in an optical frequency spectrum through optical modulation using the FM modulated signal as an original signal to send the optical-intensity-modulated signal to a receiving end.

9. The transmitter according to claim 8, wherein said optical transmitter comprises:

a light source being operable to output an unmodulated light; and an optical modulator being operable to modulate the unmodulated light with the FM modulated signal to produce the optical-intensity-modulated signal, said optical modulator having a Mach-Zehnder interferometer structure with a predetermined input-voltage versus output-optical-power characteristic, and being biased in the input-voltage versus output-optical-power characteristic such that an output optical power is at a minimum.

10. The transmitter according to claim 9, further comprising a frequency-divider provided between said FM modulator and said optical transmitter, said frequency-divider being operable to convert the FM modulated signal outputted from said FM modulator into a frequency-divided FM modulated signal whose frequency is $\frac{1}{2}^n$ of a frequency of the FM modulated signal, n being an integer of not less than 1, wherein said optical modulator modulates the unmodulated light with the frequency-divided FM modulated signal to produce the optical-intensity-modulated signal.

11. The transmitter according to claim 8, wherein said optical transmitter comprises:

a light source being operable to output an unmodulated light;

an optical branching circuit being operable to branch the unmodulated light fed from said light source into a first unmodulated light and a second unmodulated light;

an optical modulator being operable to modulate the first unmodulated light with the FM modulated signal to produce the optical-intensity-modulated signal, said optical modulator having a Mach-Zehnder interferometer structure with a predetermined input-voltage versus output-optical-power characteristic, and being biased in the input-voltage versus output-optical-power characteristic such that an output optical power is at a maximum; and an optical combining circuit being operable to combine the optical-intensity-modulated signal produced by said optical modulator and the second unmodulated light to cancel an optical carrier component of the optical-intensity-modulated signal with the second unmodulated light, and output the optical-intensity-modulated signal whose optical carrier component is suppressed.

12. The transmitter according to claim 11, wherein said optical transmitter further comprises an optical delay circuit provided between said optical branching circuit and said optical combining circuit, said optical delay circuit being operable to adjust a propagation delay of at least one of the first unmodulated light, the second unmodulated light, and the optical-intensity-modulated signal produced by said optical modulator such that the second unmodulated light and the optical carrier component of the optical-intensity-modulated signal produced by said optical modulator are set in opposite phases to each other.

13. The transmitter according to claim 11, further comprising a frequency-divider provided between said FM modulator and said optical transmitter, said frequency-divider being operable to convert the FM modulated signal outputted from said FM modulator into a frequency-divided FM modulated signal whose frequency is $\frac{1}{2}^n$ of a frequency of the FM modulated signal, n being an integer of not less than 1, wherein said optical modulator modulates the first unmodulated light with the frequency-divided FM modulated signal to produce the optical-intensity-modulated signal.

14. The transmitter according to claim 8, further comprising a frequency-divider provided between said FM modulator and said optical transmitter, said frequency-divider being operable to convert the FM modulated signal outputted from said FM modulator into a frequency-divided FM modulated signal whose frequency is $\frac{1}{2}^n$ of a frequency of the FM modulated signal, n being an integer of not less than 1, wherein said optical transmitter includes an optical modulator being operable to produce the optical-intensity-modulated signal through the optical modulation using the frequency-divided FM modulated signal as an original signal.

* * * * *